(12) United States Patent
Boguslavskij et al.

(10) Patent No.: US 9,247,354 B2
(45) Date of Patent: Jan. 26, 2016

(54) METHOD FOR THE TRANSMISSION OF DATA BETWEEN A HEARING DEVICE AND AN EXTERNAL UNIT, AND ASSOCIATED CONFIGURATION

(75) Inventors: Mihail Boguslavskij, Erlangen (DE); Ulrich Schätzle, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 221 days.

(21) Appl. No.: 13/070,783

(22) Filed: Mar. 24, 2011

(65) Prior Publication Data

US 2011/0235836 A1    Sep. 29, 2011

(30) Foreign Application Priority Data

Mar. 24, 2010  (DE) .......................... 10 2010 012 623

(51) Int. Cl.
*H04R 25/00*  (2006.01)
*H04L 7/04*  (2006.01)

(52) U.S. Cl.
CPC .............. *H04R 25/558* (2013.01); *H04L 7/041* (2013.01); *H04R 25/552* (2013.01); *H04R 25/554* (2013.01)

(58) Field of Classification Search
CPC ........... H04R 2225/55; H04R 2420/07; H04R 25/552; H04R 25/554; H04R 25/70; H04J 3/0667; H04J 3/0685; H04L 7/10
USPC .................... 381/315, 314; 370/470
See application file for complete search history.

(56) References Cited

U.S. PATENT DOCUMENTS

| | | | |
|---|---|---|---|
| 6,014,710 A * | 1/2000 | Talluri et al. .................. | 709/237 |
| 6,088,339 A | 7/2000 | Meyer | |
| 7,778,432 B2 | 8/2010 | Larsen | |
| 8,229,146 B2 | 7/2012 | Nielsen | |
| 2003/0200001 A1 * | 10/2003 | Goddard ......................... | 700/94 |
| 2005/0089183 A1 | 4/2005 | Niederdrank et al. | |
| 2007/0009124 A1 | 1/2007 | Larsen | |
| 2007/0025573 A1 | 2/2007 | Nikles et al. | |
| 2007/0030988 A1 | 2/2007 | Bauml et al. | |
| 2009/0298420 A1 | 12/2009 | Haartsen et al. | |
| 2010/0260366 A1 | 10/2010 | Heerlein et al. | |
| 2011/0235836 A1 | 9/2011 | Boguslavskij et al. | |

FOREIGN PATENT DOCUMENTS

| | | | | |
|---|---|---|---|---|
| CN | 1527500 | A | 9/2004 | |
| CN | 1901759 | A | 1/2007 | |
| DE | 19819509 | A1 | 11/1999 | |
| DE | 102008018041 | A1 | 10/2009 | |
| WO | 2004110099 | A2 | 12/2004 | |
| WO | 2007104308 | A1 | 9/2007 | |
| WO | 2009144537 | A1 | 12/2009 | |
| WO | WO 2011044898 | | * 4/2011 | .......... H04R 25/554 |

\* cited by examiner

*Primary Examiner* — James Hannett
*Assistant Examiner* — Padma Haliyur
(74) *Attorney, Agent, or Firm* — Laurence Greenberg; Werner Stemer; Ralph Locher

(57) ABSTRACT

A method and an associated configuration transmit data between a hearing device and an external unit. A first data packet is transmitted to the hearing device by the external unit. The first data packet is received by the hearing device and a second data packet is transmitted from the hearing device to the external unit. A predefinable fixed period of time elapses between the end of the receipt of the first data packet and the start of transmission of the second data packet. The external unit thereby "knows" when the first bit of the second data packet is to arrive. This offers the advantage that the reliability of a data transmission is improved. In the case of a packet-oriented data transmission fewer data packet repetitions are required, as a result of which the transmission speed increases.

6 Claims, 5 Drawing Sheets

METHOD FOR THE TRANSMISSION OF DATA BETWEEN A HEARING DEVICE AND AN EXTERNAL UNIT, AND ASSOCIATED CONFIGURATION

CROSS-REFERENCE TO RELATED APPLICATION

This application claims the priority, under 35 U.S.C. §119, of German application DE 10 2010 012 623.3, filed Mar. 24, 2010; the prior application is herewith incorporated by reference in its entirety.

BACKGROUND OF THE INVENTION

Field of the Invention

The invention relates to a method and a configuration for the transmission of data between a hearing device and an external unit. A first data packet is transmitted from the external unit to the hearing device, the first data packet is received by the hearing device, and subsequently a second data packet is transmitted from the hearing device to the external unit.

In principle, hearing devices have as their important components an input converter, an amplifier and an output converter. The input converter is as a rule a sound receiver, for example a microphone, and/or an electromagnetic receiver, for example an induction coil. The output converter is generally realized as an electro-acoustic converter, for example a miniature speaker, or as an electromechanical converter, for example a bone conduction earphone. The amplifier is generally integrated into a signal processing unit.

This structural principle is represented in FIG. 1 using the example of a behind-the-ear hearing device 1. Generally, two microphones 3 for receiving the ambient sound are built into a hearing device housing 2 for wearing behind the ear. Above the microphones 3, microphone openings 7 are embodied in the hearing device housing 2. The sound can reach the microphones 3 in the interior of the hearing device housing 2 through the microphone openings 7. A signal processing unit 4, which is likewise integrated into the hearing device housing 2, processes the microphone signals and amplifies them. The output signal of the signal processing unit 4 is transferred to a speaker or earpiece 5, which emits an acoustic signal. If applicable, the sound is transferred to the eardrum of the hearing device wearer via a non-illustrated sound tube, which is fixed in the auditory canal with an otoplastic. The power supply of the hearing devices 1 and in particular that of the signal processing unit 4 is provided by battery 6, likewise integrated into the hearing device housing 2.

Published, non-prosecuted German patent application DE 10 2008 018 041 A1, corresponding to U.S. patent publication No. 20100260366, discloses such a behind-the-ear hearing device with a microphone opening, with a volume control, a programming socket, a program button with an OFF function and with a battery compartment.

In the case of wireless data transmission between a hearing device and for example a remote control no common clock signal is available for decoding of the transferred data. Accordingly, the hearing device and the remote control must generate their clock signals from separate frequency-stable clock sources, for example quartz crystal units. Although quartz crystal units have a frequency stability of 20 ppm or better, the clock signals must be regularly synchronized, in order to correct the unavoidable "divergence" of the clock signals.

The renewed synchronization of the clock signals takes place on a continuous basis through clock recovery from the transferred data, where so-called "return-to-zero coding" or "Manchester coding" is used. The bandwidth available for user data is however thereby reduced.

In the case of packet-oriented data transmission, the clock signal can be synchronized at the start of each data packet with the aid of a synchronization sequence transmitted at the same time. In the event of disruptions to the synchronization the data cannot be decoded and the data packet must be transmitted once more. In the case of unfavorable transmission conditions, the transmission speed is thus reduced through repetition.

Published, non-prosecuted German patent application DE 198 19 509 A1, corresponding to U.S. Pat. No. 6,088,339, discloses a bidirectional data transmission method for hearing devices by signals of different pulse widths. Here, in the case of retransmission from a hearing device to a programming device in a transmission frame, a response information is inserted at a certain point.

U.S. patent publication No. 2007/0009124 A1 specifies a wireless network with a hearing device and a multiplicity of other devices. One device is the master, which transmits timing information to the other devices of the network, so that these can synchronize themselves.

SUMMARY OF THE INVENTION

It is accordingly an object of the invention to provide a method for the transmission of data between a hearing device and an external unit, and an associated configuration which overcome the above-mentioned disadvantages of the prior art methods and devices of this general type, which improves data transmission between the external unit and the hearing device.

The invention claims a method for transmitting data between a hearing device and an external unit. The method includes the transmission of a first data packet from the external unit to the hearing device, the receipt of the first data packet by the hearing device and the transmission of a second data packet from the hearing device to the external unit. A predefinable fixed period of time elapses between the end of the receipt of the first data packet and the start of transmission of the second data packet. The invention offers the advantage that the reliability of a data transmission is improved. In the case of a packet-oriented data transmission fewer data packet repetitions are required, as a result of which the transmission speed increases. The transmission strength of the hearing device can be reduced, thereby extending the useful life of a hearing device battery or the capacity of a rechargeable hearing device battery.

In a development the transmission can take place wirelessly.

In a further embodiment, the fixed period of time can be stored in the external unit.

The first data packet can further contain a synchronization sequence, with which a clock skew in the hearing device is corrected.

The invention also claims a configuration for wireless transmission of data with a hearing device and with an external unit for performing the inventive method. The predefinable, fixed period of time is stored in the hearing device.

Other features which are considered as characteristic for the invention are set forth in the appended claims.

Although the invention is illustrated and described herein as embodied in a method for the transmission of data between a hearing device and an external unit, and an associated configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
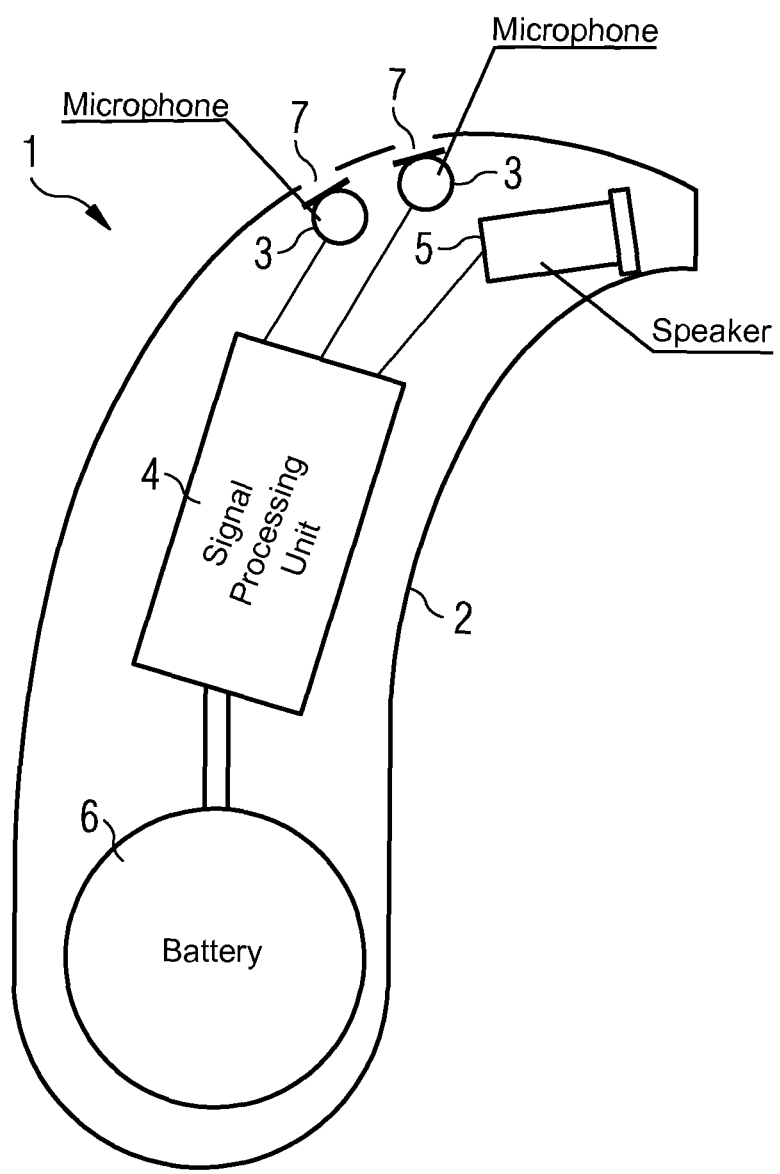
FIG. 1 is a diagrammatic, illustration of a behind-the-ear hearing device according to the prior art.
Figure 2:
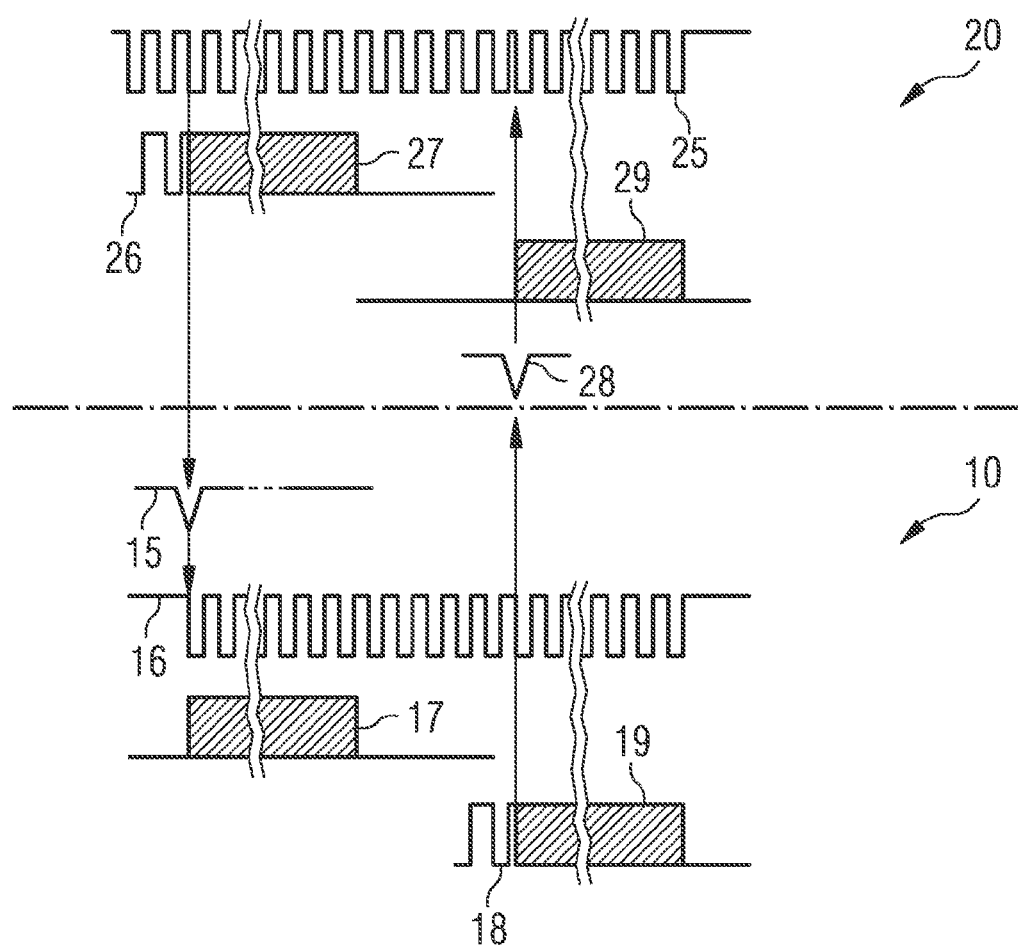
FIG. 2 is a flow diagram illustrating a data transmission between a remote control and a hearing device according to the prior art.

Referring now to the figures of the drawing in detail and first, particularly, to FIG. 2 thereof, there is shown in schematic form a flow diagram for a known wireless data transmission between a remote control 20 and a hearing device 10. An output of a first data packet 27 is synchronized by a clock signal 25 in the remote control 20. The first data packet 27 also contains a preceding synchronization sequence 26. The first data packet 27 is received by the hearing device 10, and based on the received synchronization sequence 26 a clock synchronization 15 takes place, which synchronizes a clock signal 16 of the hearing device 10 with the clock signal 25 of the remote control 20, so that the two "run in symmetry". In this way the first data packet 17 received can be correctly decoded in the hearing device 10.

The hearing device 10 responds to the remote control 20 after some time with a second data packet 19, which contains a preceding synchronization sequence 18. On the basis of the synchronization sequence 18 a clock synchronization 28 takes place in the remote control 20, by which the clock signal 16 of the remote control 20 is synchronized with the clock signal 19 of the hearing device 10. The second data packet 29 received can thereby be correctly decoded in the remote control 20.

In the case of low signal levels or interference affecting the transmission, the synchronization of the received second data packet 29 is faulty, so that a renewed transmission of the second data packet 19 must be requested.

Figure 3:
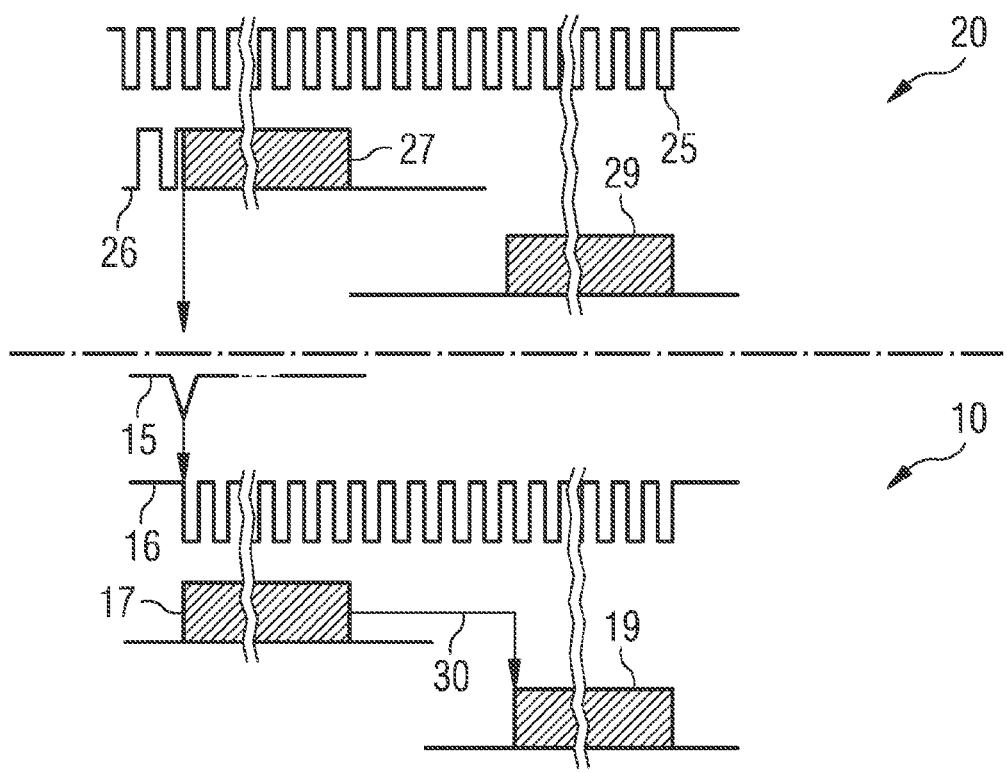
FIG. 3 is a flow diagram illustrating a data transmission between an external unit and a hearing device according to the invention.

FIG. 3 shows in schematic form a flow diagram of an inventive data transmission between the external unit 20, for example a hearing device remote control, and the hearing device 10. The output of the first data packet 27 is synchronized by the clock signal 25 in the external unit 20. The first data packet 27 also contains the preceding synchronization sequence 26. The first data packet 27 is received by the hearing device 10 and, based on the received synchronization sequence 26, a clock synchronization 15 takes place, which synchronizes the clock signal 16 of the hearing device 10 with the clock signal 25 of the external unit 20, so that the two "run in symmetry". The first data packet 17 received in the hearing device 10 can thus be correctly decoded.

According to the invention the hearing device 10 responds to the external unit 20 after a predefinable period of time 30 with the second data packet 19. The external unit 20 thereby "knows" when the first bit of the second data packet 19 should arrive. The period of time 30 is also known to the external unit 20, so that a synchronization of the external unit 20 can be dispensed with. The maximum period of time 30 depends on, among other factors, the modulation method selected and the properties of a transmission channel. The second data packet 29 received can thereby be correctly decoded in the remote control 20. Different periods of time 30 can be used, in order to take account of differing lengths of data processing in the hearing device 10.

Precise observance of the period of time 30 requires that the end of the first data packet 17 received is recognized in the hearing device 10 in a temporally resolved manner. In light of the strong signal from the external unit 20, the signal strength at the hearing device 10 is sufficiently great.

Figure 4:
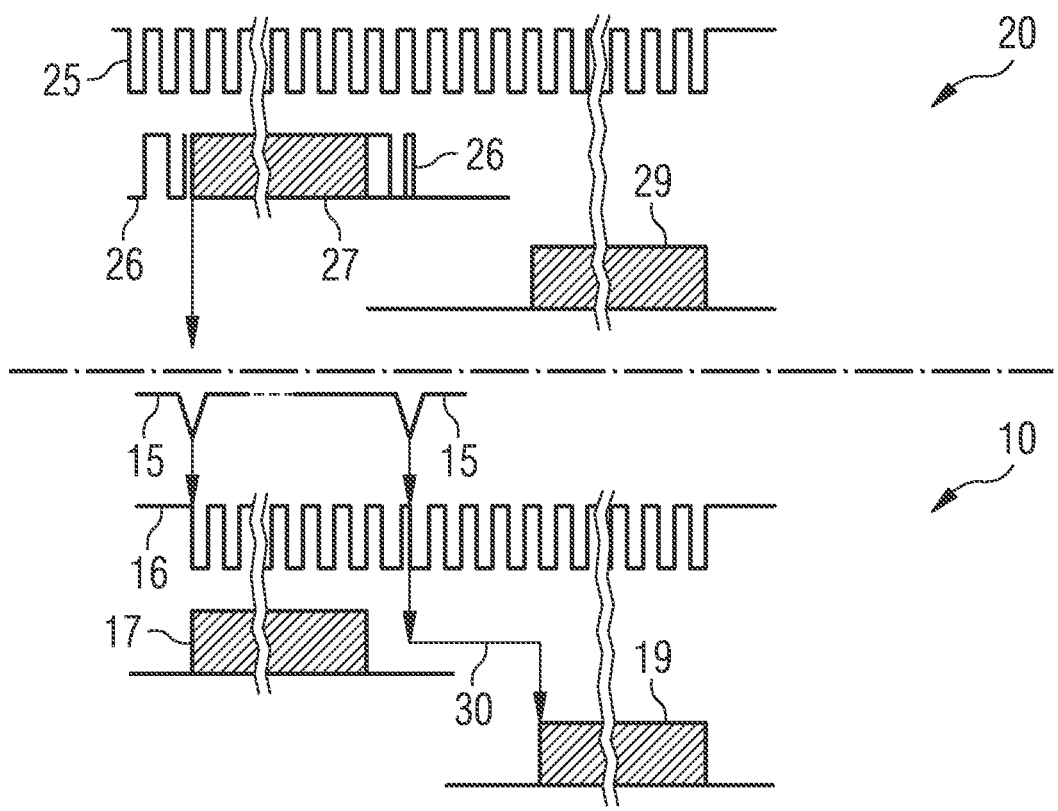
FIG. 4 is a flow diagram illustrating the data transmission between the external unit and the hearing device with synchronization sequence according to the invention.

FIG. 4 shows in schematic form a flow diagram of a further inventive data transmission between the external unit 20, for example a hearing device remote control, and the hearing device 10. The output of the first data packet 27 is synchronized by the clock signal 25 in the external unit 20. The first data packet 27 also contains the preceding synchronization sequence 26. The first data packet 27 is received by the hearing device 10 and the clock synchronization 15 takes place based on the received synchronization sequence 26, which synchronizes the clock signal 16 of the hearing device 10 with the clock signal 25 of the external unit 20, so that the two "run in symmetry". The first data packet 17 received in the hearing device 10 can thus be correctly decoded.

In the case of long first data packets 27, the hearing device clock signal 16 and the clock signal 25 of the external unit 20 can drift apart during the data transmission and lead to inaccuracies. In order to prevent this happening, a synchronization sequence 26 is transferred to the hearing device 10 as shown in FIG. 4 at the end of the first data packet 27 from the external unit 20. The synchronization sequence 26 uses the hearing device 10 for clock synchronization 15, in order to correct a drift of the clock signal 16.

According to the invention the hearing device 10 then responds to the external unit 20 after a predefinable period of time 30 following the end of the received synchronization sequence 26 with a second data packet 19. The period of time 30 is also known to the external unit 20, so that synchronization of the external unit 20 can be dispensed with. The external unit 20 thereby "knows" when the first bit of the second data packet 19 should arrive. The second data packet 29 received in the remote control 20 can thereby be correctly decoded. Different periods of time 30 can be used, in order to take account of data processing times of differing lengths in the hearing device 10.

Figure 5:
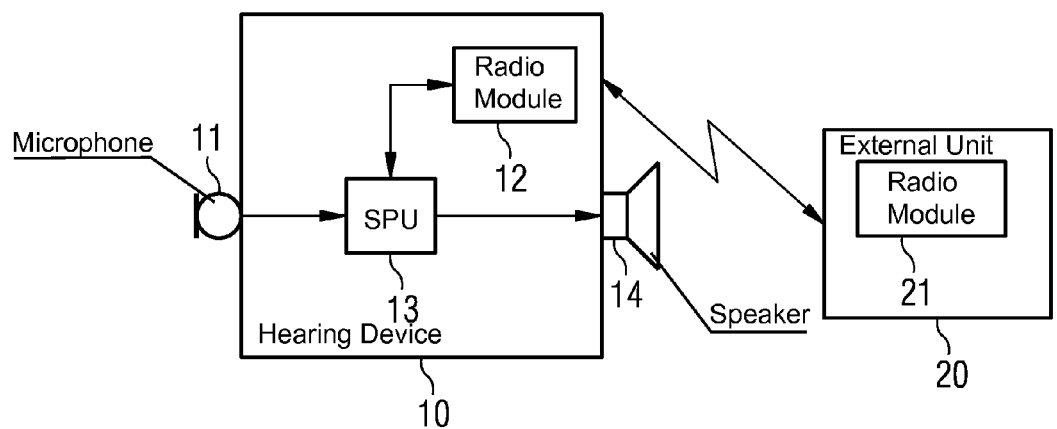
FIG. 5 is a circuit diagram of a configuration with the external unit and the hearing device according to the invention.

FIG. 5 shows an inventive arrangement for wireless data transmission between the external unit 20 and the hearing device 10. The hearing device 10 contains a microphone 11, a signal processing unit 13 and an earpiece 14. With the aid of a first radio module 12 wireless data can be transmitted to the external unit 20 or received from the same. The external unit 20 contains a second radio module 21 for wireless communication with the first radio module 12 of the hearing device 10. According to the invention a predefinable fixed period of time elapses during data transmission between the end of the receipt of a first data packet output by the external unit in the first radio module 12 and the start of transmission of a second data packet from the hearing device 10 to the external unit 20. The period of time is stored in the hearing device 10 and in the external unit 20.

The invention claimed is:

1. A method for transmitting data between a hearing device and an external unit, which comprises the steps of:
    transmitting a first data packet from the external unit to the hearing device;
    receiving the first data packet in the hearing device; and
    transmitting a second data packet from the hearing device to the external unit after a predefinable fixed period of time based on a received synchronization sequence following an end of a receipt of the first data packet, the predefinable fixed period of time being stored in the external unit and in the hearing device, and the external unit knowing when a first bit of the second data packet arrives based on the predefinable fixed period of time, during the transmitting of the second data packet from the hearing aid to the external unit.

2. The method according to claim 1, which further comprises performing the transmitting steps wirelessly.

3. The method according to claim 1, wherein the first data packet contains a synchronization sequence, with which a clock skew in the hearing device is corrected.

4. A configuration for wireless transmission of data, comprising:
    a hearing device storing a predefinable fixed period of time; and
    an external unit storing the predefinable fixed period of time, said external unit and said hearing device programmed to:
    transmit a first data packet from said external unit to said hearing device;
    receive the first data packet in said hearing device; and
    transmit a second data packet from said hearing device to said external unit after the predefinable fixed period of time based on a received synchronization sequence following an end of a receipt of the first data packet, said external unit knowing when a first bit of the second data packet arrives based on the predefinable fixed period of time during a transmission of the second data packet from said hearing aid to said external unit.

5. The configuration according to claim 4, wherein said external unit is a hearing device remote control.

6. The configuration according to claim 4, wherein:
    said hearing device has a first radio module; and
    said external unit has a second radio module.

* * * * *